Dec. 16, 1969  W. L. WARD  3,484,790
TIME RECORDER

Filed Dec. 18, 1967  5 Sheets-Sheet 1

INVENTOR:
Wardell L. Ward

ATTORNEYS

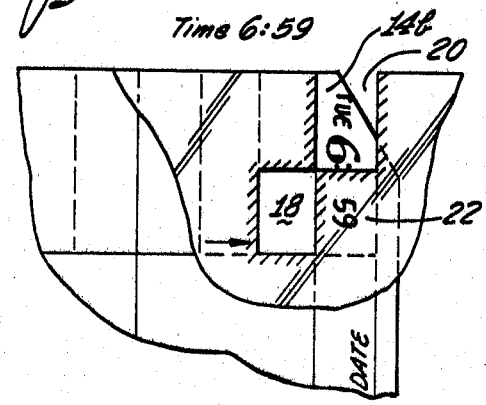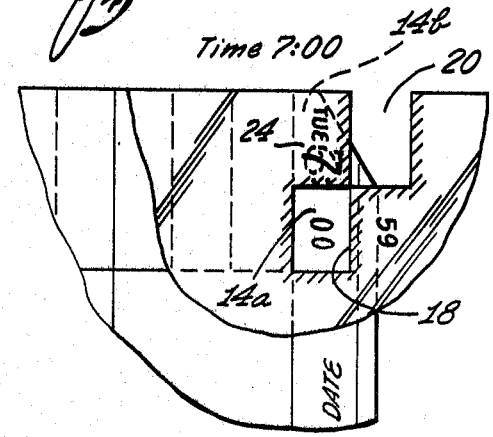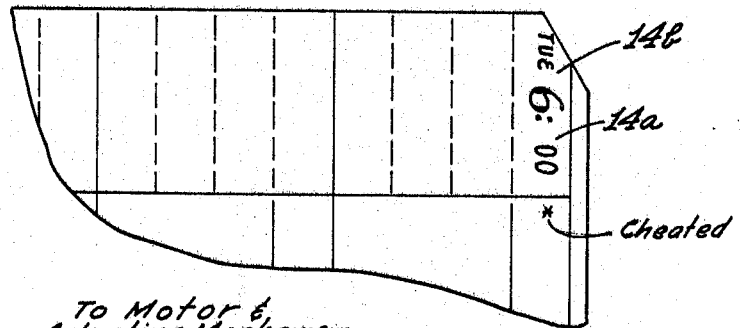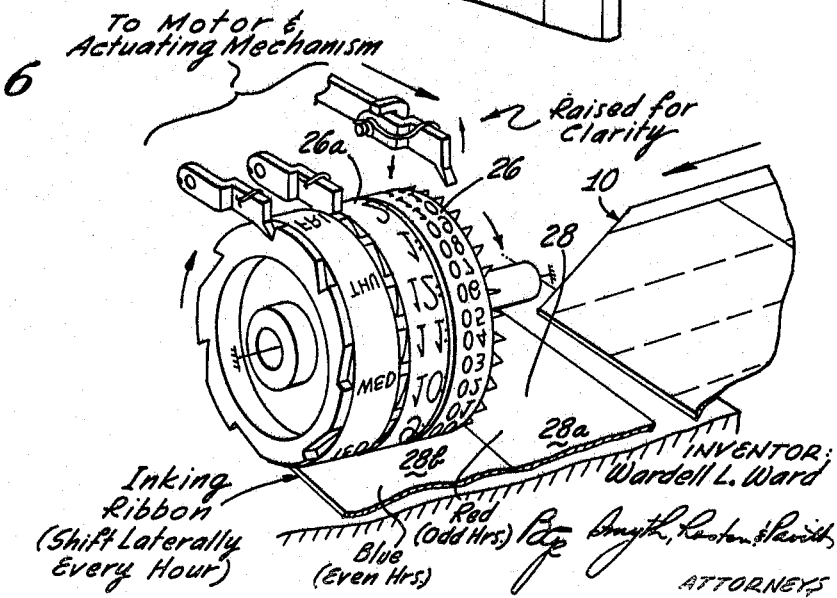

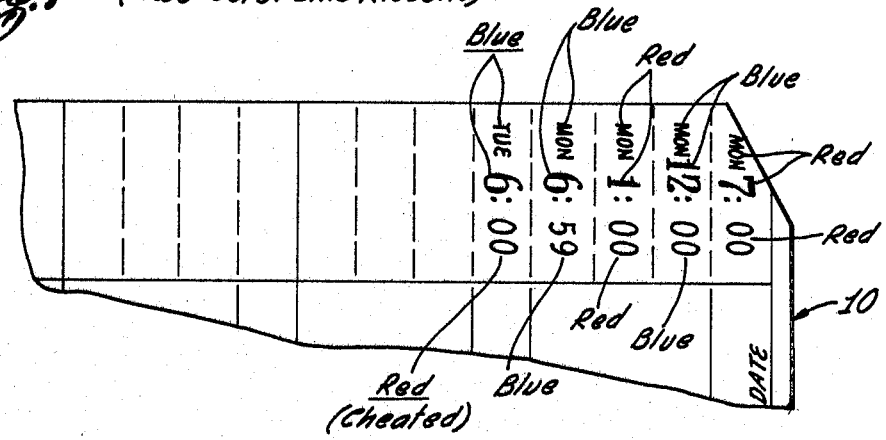
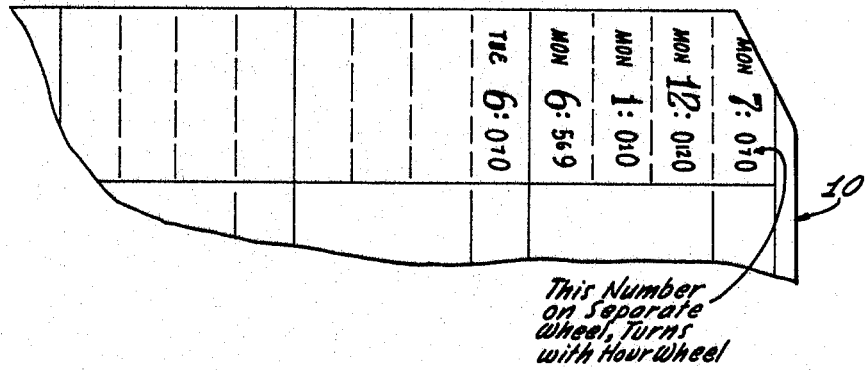
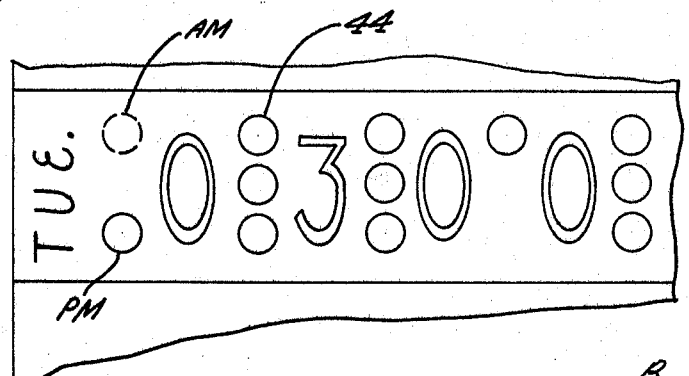

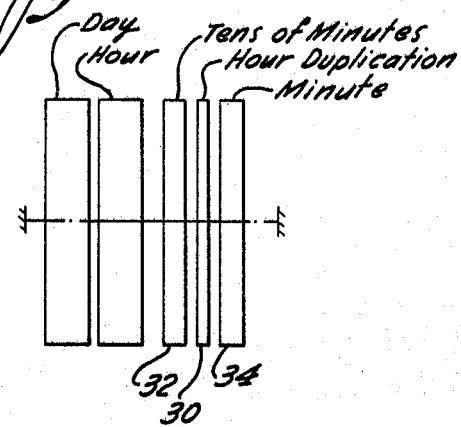
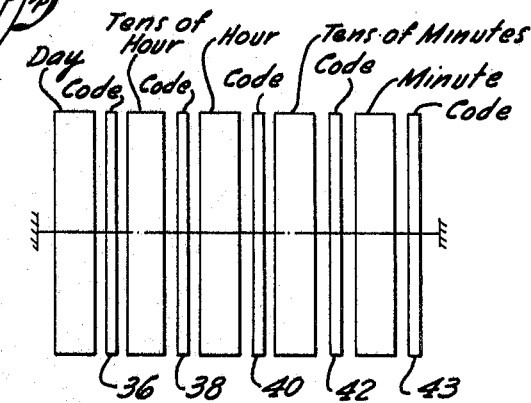
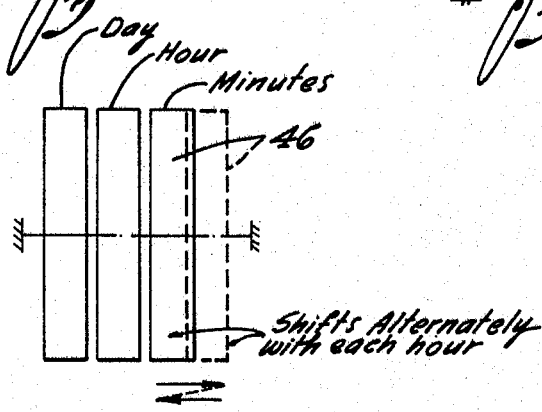
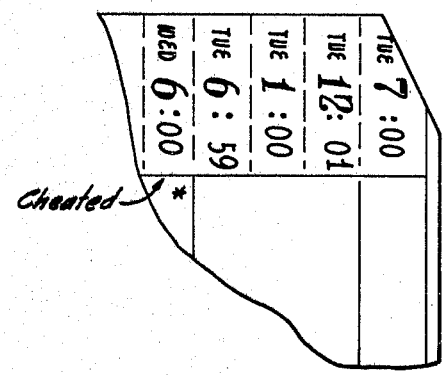
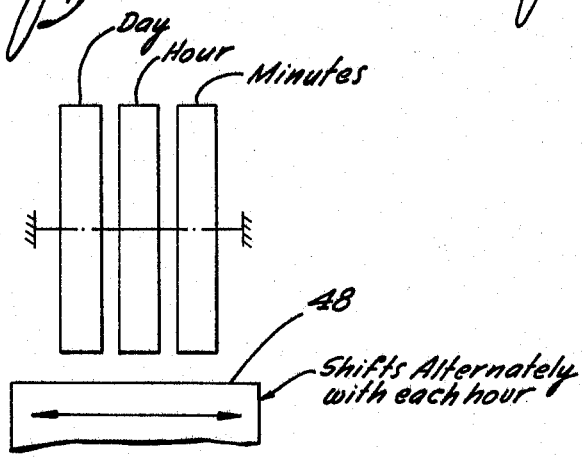
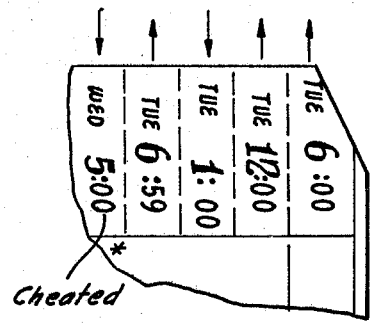

Dec. 16, 1969  W. L. WARD  3,484,790
TIME RECORDER
Filed Dec. 18, 1967  5 Sheets-Sheet 5
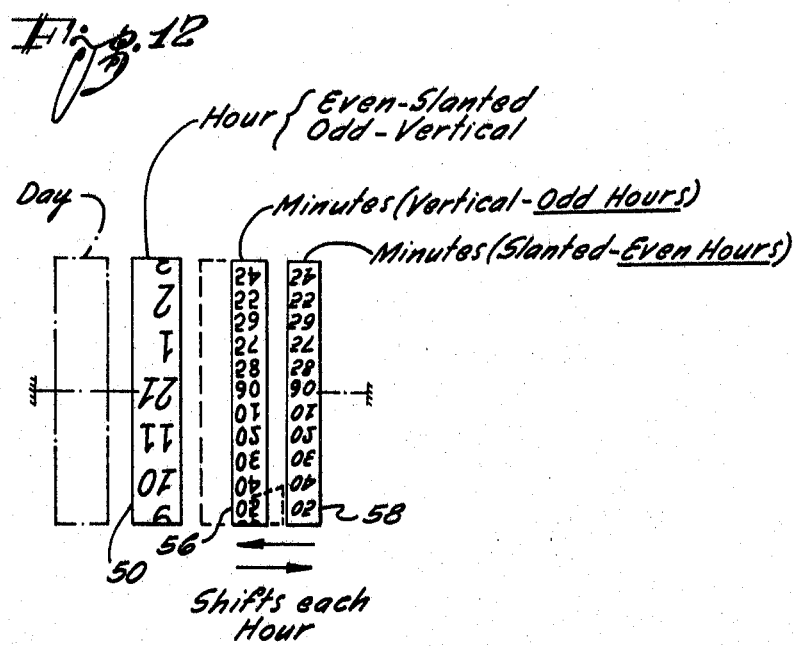
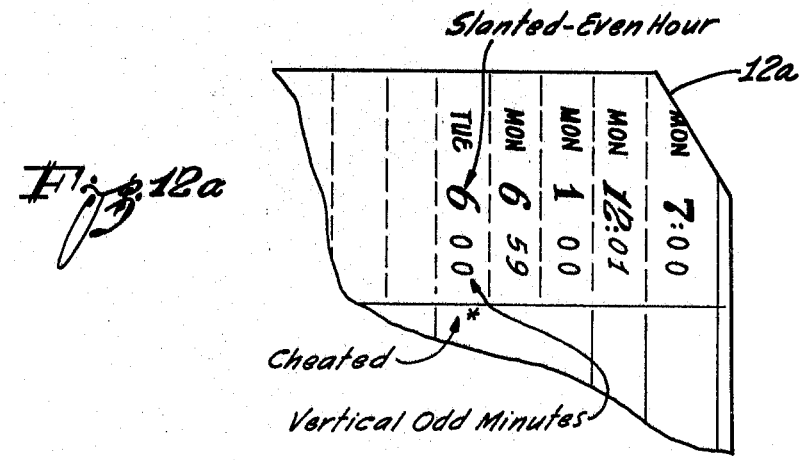
INVENTOR:
Wardell L. Ward
ATTORNEYS United States Patent Office 3,484,790
Patented Dec. 16, 1969

3,484,790
TIME RECORDER
Wardell L. Ward, P.O. Box 75982,
Los Angeles, Calif. 90005
Filed Dec. 18, 1967, Ser. No. 691,379
Int. Cl. G01d 9/36
U.S. Cl. 346—59
1 Claim

ABSTRACT OF THE DISCLOSURE

Existing industrial time clocks are capable of being misused by employing screening or "cheater" cards which are placed against, and inserted with, the usual time clock card, so as to blank out the printing of minutes with one insertion of the card, and the hour, on a second insertion. By such manipulation, employees can record on the card almost two extra hours of time which the time card will then indicate was worked by the employee. Such time clock cheating is prevented by the present invention in which special means are provided for use with the minute printing wheel to indicate the true hour when the minutes are printed on the card. Among the possible means shown are an additional hour wheel printing closely in conjunction with the minute wheel, either in plain figures or in code; an alternately colored ribbon for printing different consecutive hours; different character printing for different consecutive hours; different minute wheel disposition for different consecutive hours; and different card dispositions in relation to the printing wheels for different consecutive hours.

BACKGROUND OF THE INVENTION

Field of the invention

This invention relates to time clocks and particularly to improvements in such clocks to prevent fraudulent manipulation thereof, whereby employees may be enabled to cheat their employers.

Although industrial time clocks have been in use for more than a half century and are quite universally employed both in government and private industry, it has recently come to the attention of the present inventor that unscrupulous employees have devised and been using what may be referred to as screening or "cheater" cards in order to make it appear to their respective employers that they have worked more hours in a day than they actually have worked. Presently known industrial time clocks are quite vulnerable to such misuse and resulting fraud upon the employers using such clocks.

Conventional industrial time clocks basically are constructed with a housing into which a time card is inserted for stamping of the date, hour and minutes within the hour when the insertion of the card occurs. The stamping is accomplished by the triggering, upon the proper insertion of the card, of an impacting element which presses the card quickly and firmly against an inking ribbon behind or below which are disposed a series of dies on the circumferences of a plurality of wheels, one for the month of the year, one for the day, one for the hour and one for the minutes within the hour during which the insertion of the card is accomplished. In some instances a wheel might be provided for the year as well. Each of these wheels may be driven by some type of motor, usually electric, to rotate sporadically a preselected distance with the passage of a preselected but different time interval. Thus, the minute wheel ordinarily will rotate completely with the passage of each hour and make $\frac{1}{60}$ of a revolution at the end of each minute; the hour wheel, may move $\frac{1}{24}$ of a revolution at the end of each hour; the day wheel, $\frac{1}{30}$ or $\frac{1}{31}$ at the end of each full 24 hour period; the month, $\frac{1}{2}$ at the end of each 30 or 31 day period. Alternatively, the day, month and year which may require manual resetting and not be operated automatically by the motor drive.

In computing the employee's pay, the employer relies, for proof of the number of hours the employee asserts he has been in the employer's establishment, and presumably was working for his employer on any given day, upon the time difference between consecutive time stampings which are printed on the employee's time card.

However, time clocks of the type thus described can be made to print erroneous time information on the cards which are to be employed therewith, by laying over and inserting with the regular time card what has been referred to as a "cheater" card. This "cheater" may be of approximately the same size as the time card to register therewith, but is provided with apertures through which, in one insertion of both the time card and the overlaid "cheater," only the hour is printed on the regular time card; and upon the second insertion, only the minutes of the hour are printed on the latter. If this double insertion into the time clock is made first at the end of a given hour, just before the hour printing advances to the next hour number; and secondly, just after the hour printing so advanced, the result of the double stamping on the employee's card will be a time indication almost one full hour earlier than the card was first actually inserted into the time clock. This could give the employee one more hour in the morning. Conversely, the system can be reversed upon the employee's departure to give him almost one full hour more in the evening. Thereby the employee's time card would indicate that almost two hours more was worked than was actually done.

Such cheating is prevented by the present invention.

Description of the prior art

Apparently workmen using time cards have been trying to devise methods to "beat the clock" for as far back in the past as the time clock systems have been in use, and a number of patents may be found in which their objects have included methods or mechanisms for preventing such time clock misuses. Thus the patent to Horace R. McCabe, No. 1,215,683, issued in 1917 describes a handle locking arrangement to prevent improper manipulation of the device. Certain other patents such as those to Goss et al., No. 1,348,218; to Streckfuss, No. 2,171,167; to Johnson, No. 2,501,904; Sprecker, No. 2,645,551; and to Gross, No. 2,968,521, describe various systems for punching or cutting the time cards upon each insertion to prevent insertion for a re-stamping on the same card area or to distinguish between "in" stampings and "out" stampings.

In addition, a patent to Cooper, No. 2,922,687, makes provision for the punching of a time on a card in the form of coded punched holes so that the card may be automatically processed by machine.

No prior art has been found, however, which has been directed to preventing the use of the "cheater" cards to cause fraudulent time entries to be made on the cards.

SUMMARY OF THE INVENTION

The prevention of time clock cheating by the use of "cheater" cards is accomplished by the present invention by providing means, actuated by the drive for the hour wheel of the clock, which means provides an indication upon the time card at a location which is preferably remote from hour stamping and closely associated with the minute stamping, such indication serving to distinguish the stamping of minutes during any particular hour from that stamping of minutes which occurs during the preceding and following hour. Among the possible means shown are an additional hour wheel printing closely in conjunction with the minute wheel, either in plain figures or in code; an alternately color ribbon for printing different consecutive hours; different character printing for different consecutive hours; different minute wheel disposition for different consecutive hours, and different card disposition in relation to the printing wheels for different consecutive hours.

BRIEF DESCRIPTION OF DRAWINGS

FIG. 3 is a plan view of the stamping made by a time clock on the card of FIG. 1 when a FIG. 2 "slicker" card has been superimposed upon it and both are inserted into the time clock the first time at 6:59.

FIG. 4 is similar to FIG. 3, but when both have been inserted the second time at 7:00.

FIG. 5 shows the net result of the two insertions with the "slicker" card.

FIG. 6 is a schematic view, partially in perspective of a typical time clock wheel arrangement with which alternate colored ribbons are provided in accordance with one embodiment of the present invention.

FIG. 7 is a plan view of a portion of a time card which has been inserted in a time clock with a wheel arrangement of the type illustrated in FIG. 6.

FIG. 8 is a schematic diagram of a stamping die wheel arrangement in accordance with another embodiment of my invention.

FIG. 8a is a plan view of a portion of a time card which has been inserted in a time clock with an additional wheel according to the embodiment of the present invention illustrated in FIG. 8.

FIG. 9 is a schematic diagram of a stamping die wheel arrangement using coded wheels in accordance with a still further embodiment of my invention.

FIG. 9a is a plan view of a portion of a time card which has been inserted in a time clock with coding wheels according to a still further embodiment of the present invention illustrated in FIG. 9.

FIG. 10 is a schematic diagram of a stamping die wheel arrangement in which the wheel dies shift axially alternately with each change of the hour, in accordance with a still further embodiment of my invention.

FIG. 10a is a plan view of a portion of a time card which has been used both legitimately and with a "slicker" in a time clock with the wheel arrangement of the embodiment of FIG. 10.

FIG. 11 is a schematic diagram of a stamping die wheel arrangement with a card guide which shifts parallel to the axis of the wheels alternately with each change of the hour, in accordance with a still further embodiment of my invention.

FIG. 11a is a plan view of a portion of a time card which has been used both legitimately and with a "slicker" in a time clock with the wheel and card guide arrangement of FIG. 11.

FIG. 12 is a schematic diagram of a further embodiment of the invention.

FIG. 12a is a plan view of a portion of a time card employed with the embodiment of FIG. 12.

DESCRIPTION OF THE PREFERRED EMBODIMENTS

Figure 1:
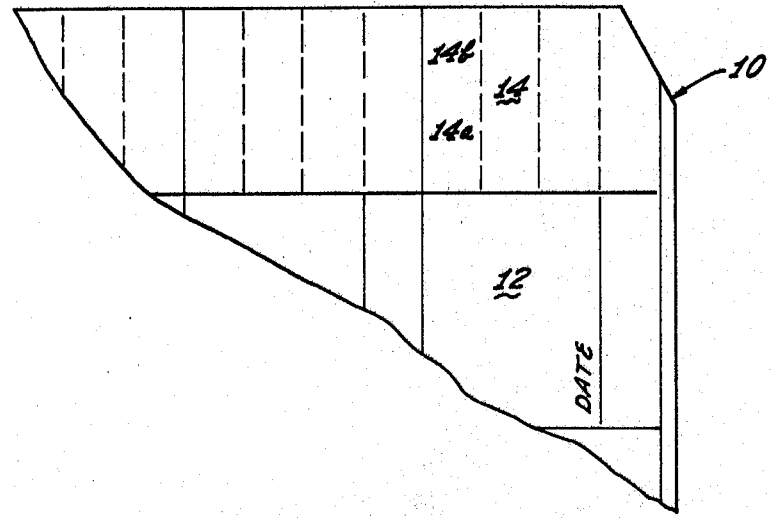
FIG. 1 is a plan view of a portion of a typical time card.

In order to understand fully the necessity for, and what is accomplished by, the present invention, one must understand first, the manner in which unscrupulous employees are able to defraud their employers who use the types of time clock which are currently available and into which time cards, such as that illustrated in FIGURE 1, are inserted. Such time card 10 includes space 12 upon which the time clock stamps the date, and an adjacent space 14 upon which both the hour and minutes within that hour of the card insertion into the clock, are stamped.

Figure 2:
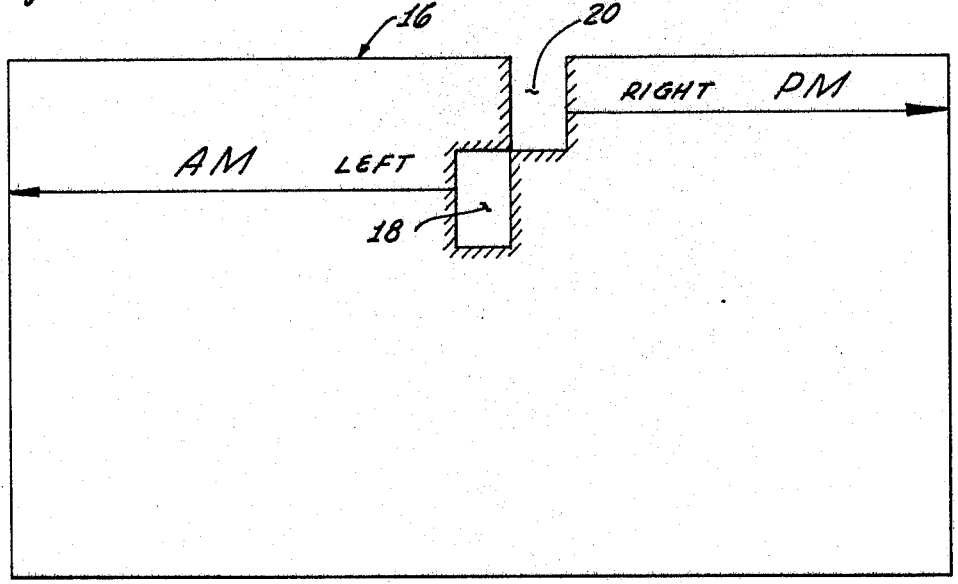
FIG. 2 is a plan view of a type of a "slicker" or "cheater" card.

The normally effective system of time clock stamping upon the employee's card, may, however, be tampered with to provide a false indication of the time of card stamping, by superimposing upon the time card 10 a "cheater" or "slicker" card 16 of the type illustrated in FIGURE 2. This card includes two cut-outs or windows 18, 20, the former of which is aligned with the portion 14a of the space 14 upon which the clock (not shown) stamps the minutes of the hour of the card insertion, and the other of which is aligned with the portion 14b of the space 14 upon which the clock stamps the hour of the card insertion.

The manner in which the "cheater" or "slicker" card 16 is employed to secure a false time indication for the benefit of the employee is illustrated in FIGURES 3, 4 and 5. When the "slicker" card 16 is properly superimposed upon the time card 10 with hour window 20 aligned to receive the time stamping toward the end of a particular hour (for example at 6:59), and both cards 16 and 10 are inserted into the time clock, the 6:59 stamping of the clock is divided between the 6 which is stamped upon the time card portion 14b through the window 20 and the "59" which is stamped upon the portion 22 of the "slicker" card 16 which portion is adjacent the window 20. When the clock reaches the next succeeding hour (in this case "7:00"), the "slicker" card 16 is shifted on the time card 10 one space in the direction of the arrow so that the window 18 is now adjacent the previously stamped "6:." Upon reinserting the two cards 10 and 16 thus superimposed into the time clock, the clock now stamps the "7:" upon the "slicker" card portion 24, and permits the "00" stamping to be impressed upon the time card 10 in the portion 14a of the space 14, with the result shown in FIG. 5, namely "6:00." Thereby, the employee is enabled to indicate to his employer's accounting department that he worked some 59 minutes longer than he was actually at the plant. Upon leaving, the employee reverses the process to first stamp in the minutes (e.g. "59") and then the later hour one or two minutes later, again picking up on his time card some 59 minutes more than he was actually in the plant.

The present invention serves to prevent such defrauding by the use of "slicker" cards in any one or a combination of a number of ways. In the embodiment illustrated in FIGURE 6, the ribbon 28 which is interposed between the wheel dies 26 and the time card is comprised of a red half 28a and a differently colored (for example, blue) half 28b, and means (not shown) are provided to effect a shifting of the ribbon 28 laterally with each change of the hour die 26a so that during one hour (e.g. 6:00 to 6:59) all stamping is accomplished with the red half 28a, while during the next consecutive hour (e.g. 7:00 to 7:59), all stampings with the wheel dies 26 are done with the blue half 28b of the ribbon. The results of a legitimate use of the time card will produce the time stampings in consistent colorings as shown for the times 7:00, 12:00, 1:00 and 6:59 on FIGURE 7. However, where an attempt is made to defraud the employer by the use of the "cheater" card in the manner explained hereinabove, the time 6:00 will be produced in two different colors, as also indicated on FIGURE 7. Such color difference will enable the employer's accounting department easily to note the attempt by the employee to defraud his employer.

Fraud is prevented by the embodiment illustrated schematically in FIG. 8 of the invention by the stamping by means of the additional die wheel 30 between the two wheels 32, 34, which produce the minutes, of the true hour during which the stamping of minutes occurs, so that the results will appear where the card is used legitimately as shown for the times 7:00, 12:00, 1:00 and 6:59 in FIG. 8a, but as shown at 6:00 where the "slicker" card is used.

The embodiment with the code wheels 36, 38, 40, 42, 43 shown schematically in FIG. 9, will produce code markings 44 according to a predetermined system, as shown in FIG. 9a. These wheels may be operated to indicate in code the actual hour of stamping the minutes as a cross check for the hours stamped.

The shifting of the minute wheel 46 alternately with each succeeding hour, as contemplated by the embodiment of FIG. 10, will also be effective to prevent fraud. Thus the use of the "slicker" card will result in a noticeable difference as shown in FIG. 10a for the alleged time 6:00.

Similarly, the use of the guide 48, as illustrated in FIG. 11, will result in detectable use of the "slicker" card, as shown for the time 6:00 in FIG. 11a.

In the embodiment of FIG. 12, the hour wheel 50 is provided with figures 52, 54 which are alternately different either in size or type for odd and even hours; and a two parallel minute wheels 56, 58 are disposed and moved into stamping position alternatively with each change in hour. Preferably one minute wheel 56 will have type which matches the figures 52 for the odd hours on the hour wheel 50, and the other minute wheel 58 will have type which matches the figures 54 for the even hours on hour wheel 50. Any attempt to use a "cheater" card with this type of system will result in a mismatching of hour and minute figures as shown at "6:00" on FIGURE 12a.

While the several embodiments of the present invention have been illustrated schematically, any person skilled in the time clock art will readily recognize the advantages of each of these different embodiments and will understand how to coordinate the wheels mechanically to accomplish the indicated results.

What is claimed is:

1. An improvement in time clock systems of the type wherein there is imprinted upon a time card inserted in an aperture in the time clock housing, characters indicating the month, day, hour and minute the card is inserted in such aperture, such imprinting being accomplished by means of character dies disposed circumferentially about a plurality of wheels adapted to rotate about a common axis or parallel axes, the peripheries of said wheels passing tangentially of the plane of the surface of the time card when the latter is so inserted in the clock housing, but each said wheel having a different rate of rotation relative to the rates of rotation of the other wheels, said improvement comprising:

means operating in association with the wheel having the characters indicative of the minutes within the hour of card insertion in said aperture, but separate from the wheel having the characters indicative of such hour of insertion; said means (a) providing an imprinted distinction upon the card of any particular hour during which the printing of the minute characters on the card occurs from the printing of the time characters which occur during the next hour; and (b) comprising at least one additional wheel disposed in close proximity to the wheel printing the minute-indicative characters, said additional wheel being set to rotate at the same speed as the hour-indicative wheel, and said additional wheel further being provided with dies to stamp in a code an indication of the hour that the minute-indicating characters are printed upon the card upon insertion of the card into the aperture of the time clock housing.

References Cited

UNITED STATES PATENTS

| | | | |
|---|---|---|---|
| Re. 12,761 | 3/1908 | Hawley | 346—83 |
| 842,132 | 1/1907 | Blair | 346—61 |
| 888,069 | 5/1908 | Dey | 346—84 X |
| 1,010,575 | 12/1911 | Blair | 346—47 |
| 1,010,576 | 12/1911 | Blair | 346—47 |
| 1,430,437 | 9/1922 | Crook | 346—59 |
| 1,731,550 | 10/1929 | Streckfuss | 346—85 |
| 1,755,906 | 4/1930 | Yates | 346—47 |

JOSEPH W. HARTARY, Primary Examiner

U.S. Cl. X.R.

346—47, 86, 141